Figure 1:
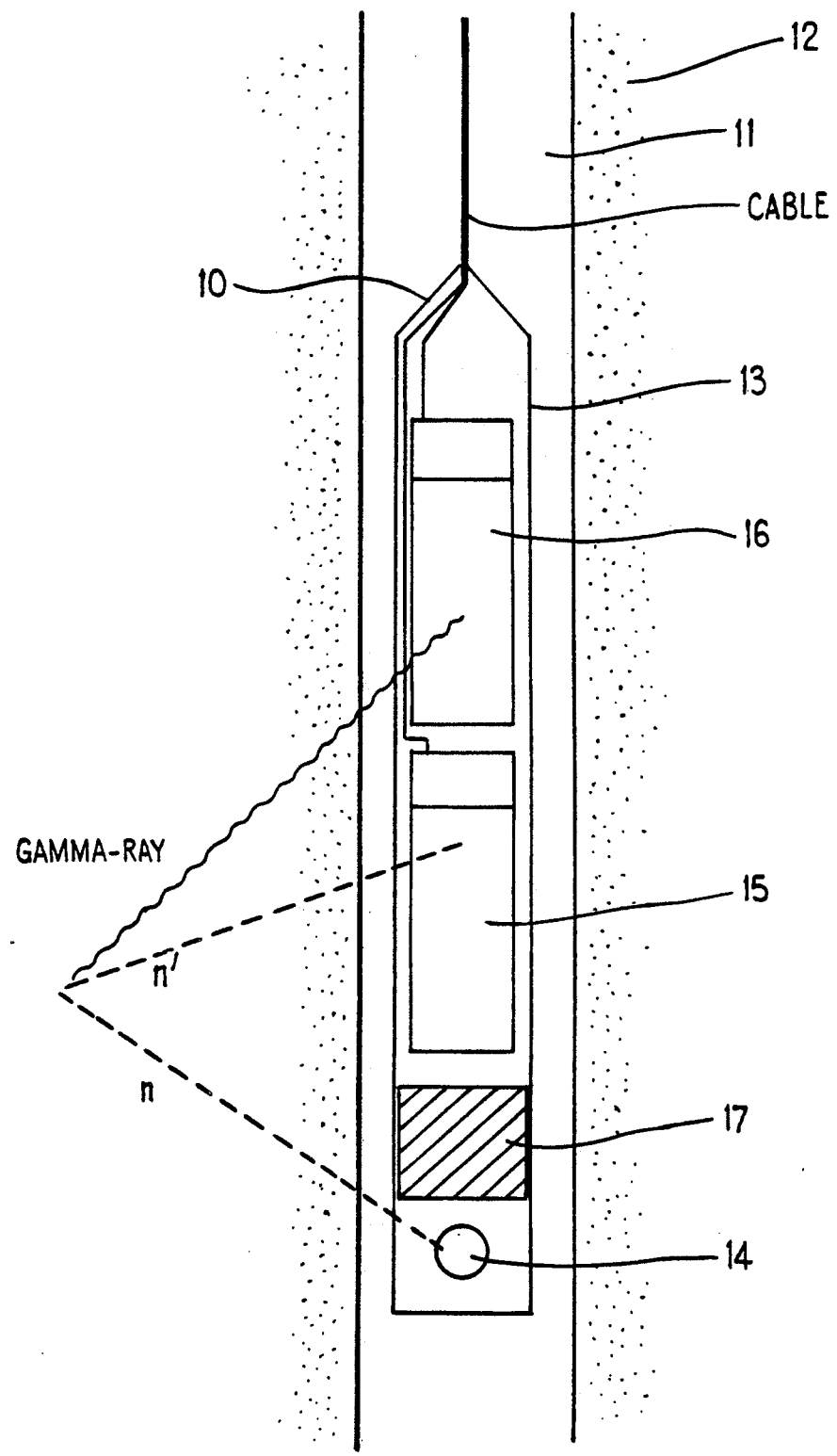

United States Patent [19]

Wormald et al.

[11] Patent Number: 5,068,532

[45] Date of Patent: Nov. 26, 1991

[54] ANALYSIS USING NEUTRONS

[75] Inventors: Malcolm R. Wormald, Abingdon; Bruce W. Thomas, Wantage, both of United Kingdom

[73] Assignee: United Kingdom Atomic Energy Authority, London, England

[21] Appl. No.: 496,139

[22] Filed: Mar. 19, 1990

Related U.S. Application Data

[63] Continuation of Ser. No. 268,285, Nov. 7, 1988, abandoned.

[30] Foreign Application Priority Data

Nov. 12, 1987 [GB] United Kingdom ............... 8726477

[51] Int. Cl.$^5$ .............................................. G01V 5/00
[52] U.S. Cl. ............................... 250/270; 250/269; 250/265
[58] Field of Search ............... 250/270, 269, 266, 265

[56] References Cited

U.S. PATENT DOCUMENTS

| | | | |
|---|---|---|---|
| 4,239,965 | 12/1980 | Oliver et al. | 250/270 |
| 4,387,302 | 6/1983 | Givens | 250/270 |
| 4,430,567 | 2/1984 | Oliver et al. | 250/270 |
| 4,766,543 | 8/1988 | Schmidt | 250/270 |

Primary Examiner—Janice A. Howell
Assistant Examiner—Richard Hanig
Attorney, Agent, or Firm—William R. Hinds

[57] ABSTRACT

A tool suitable for borehole logging, including production oilwell borehole logging, contains a radioisotope neutron source (14), a fast neutron detector (15) and a gamma-ray detector (16). Gamma-ray detection events are selected for building spectra by coincidence or anti-coincidence with detection of the associated neutron. In a development, additional information is derived from identification of which of a series of time intervals encompasses detection of a neutron after detection of a gamma-ray.

14 Claims, 7 Drawing Sheets

ANALYSIS USING NEUTRONS

This is a continuation of application Ser. No. 268,285 filed Nov. 7, 1988, now abandoned.

In the use of neutron irradiation coupled with gamma-ray detection for analysis of materials, and in particular in the logging of production oilwell boreholes, many factors can combine to make analysis of the resultant gamma-ray spectrum difficult. Thus, there is a variety of different reactions possible between the neutrons and the nuclei in the target material, the probability for any particular reaction depending, inter alia, upon the identity and concentration of the target nucleus and the energy distribution of the neutrons. This energy distribution changes as the cloud of neutrons moves through the target material and neutrons lose energy through elastic and inelastic scattering.

In known techniques using neutron interrogation for borehole logging some elements are detectable from the characteristic gamma-rays they emit following neutron capture. Some elements have a low capture cross-section and are not detectable in this way. Carbon and oxygen fall into this category, which is unfortunate because a determination of the concentrations of these elements is a key requirement in borehole logging.

A possibility for determination of these elements is offered by inelastic neutron scattering reactions, in which gamma-rays are emitted together with a scattered neutron and have an energy which is characteristic of the scattering nucleus. However, the gamma-ray spectrum from inelastic neutron scattering reactions and the gamma-ray spectrum from other reactions, notably capture reactions, are superimposed. Interference between a peak in the gamma-ray spectrum due to neutron capture reactions with nuclei of one element and a peak due to inelastic scattering by nuclei of another element makes it impossible to use those peaks in the total gamma-ray spectrum to give a quantitative measure of the concentration of those elements.

Where the logging is to be carried out in a production oilwell borehole, the problems multiply because (a) borehole fluids such as water and the production oil, which are in close proximity to the neutron source, exert a strong influence on the response detected;

(b) the borehole lining, similarly in close proximity to the neutron source and containing iron with its high capture cross-section for thermal neutrons, also exerts a strong influence on the response detected; and (c) the logging tool has to have a small diameter, thus restricting the size of detector which can be used.

Timing offers a possible solution. Gamma-rays from inelastic scattering reactions appear a very short time after exposure of the sample to an incident burst of fast neutrons. Thus, a neutron leaving a neutron generator at about 14 MeV will travel at approximately 0.05 m per nanosecond. If the neutron undergoes inelastic scattering, the scattered neutron will be slowed, depending upon the reaction conditions, to a velocity in the range 0.01 m–0.04 m per nanosecond. The associated gamma-ray, emitted almost instantaneously (within less than $10^{-16}$ seconds), travels at the speed of light (approx 0.3 m per nanosecond). On the other hand, gamma-rays from capture reactions emerge after a longer period, there being a delay due to the time taken for the neutrons to reach thermal velocities (by the process of energy loss through elastic and inelastic scattering) at which the cross-sections for neutron capture become significant. Thus it may take of the order of 100 microseconds to 1 millisecond for neutrons at 14 MeV to be slowed to thermal velocities. Upon capture, the characteristic gamma-ray emission of the particular capture reaction occurs almost instantaneously (again within less than $10^{-16}$ seconds).

It is known to make use of these timing effects to separate the inelastic scattering gamma-ray spectrum from the capture gamma-ray spectrum by irradiating the sample with a succession of neutron pulses and time-gating appropriately the response of the gamma detector in synchronism with the generation of the neutron pulses. For this an expensive pulsed neutron generator is required, with the added difficulty, for borehole logging, of providing the generator and detectors in an assembly suitable for feeding down the borehole together with a high voltage supply for the generator.

Furthermore, problems in the spectral analysis are not completely avoided because signals derived from gamma-rays emitted in high energy neutron reactions principally with oxygen nuclei (from, for example, oxygen in the formation water, and oxygen in the host rock) interfere with signals derived from the 4.43 MeV gamma-rays from carbon.

The present invention is based upon the appreciation that, for a useful proportion of inelastic neutron scattering events, it is possible, using a gamma detector and a neutron detector, to detect in coincidence the scattered neutron and the associated gamma-ray.

The invention provides, in one of its aspects, a method for analysis of material comprising irradiating the material with fast neutrons, detecting resultant gamma-rays, detecting fast neutrons scattered from the material, and registering the number of gamma detection events at at least one selected energy which occur in coincidence or anticoincidence with detection of a scattered neutron.

By coincidence we mean that the time interval between the occurrences is less than a predetermined time interval chosen to be such as is likely to encompass differences in arrival and/or detection times for the respective associated gamma-ray and scattered neutron, whilst being short enough to exclude fortuitous coincidences from other reactions. By anticoincidence we mean gamma detection events which occur outside the predetermined time interval set for defining coincidence. The invention includes apparatus for analysis of material comprising a source of neutrons, a gamma-ray detector, a fast neutron detector, and means for registering the number of gamma detection events at at least one selected energy which occur in coincidence or anticoincidence with detection of a scattered neutron, the source of neutrons being such as to provide neutrons at an energy in excess of the threshold energy for the inelastic scattering reaction which, amongst those reactions of interest for the analysis, has the highest threshold energy. For example if inelastic scattering reactions with carbon and oxygen are of interest, neutrons in excess of 6.1 MeV are required to excite the inelastic scattering reaction with oxygen. If only carbon is of interest then it is only necessary for the incident neutron energy to exceed 4.4 MeV and, indeed there is advantage, where practicable, in avoiding excitation of higher energy reactons which may introduce additional complication of the resulting gamma-ray spectrum.

It has been further appreciated that additional information may be derived by extending the use of the above discussed timing characteristics. Thus, in another of its aspects, the invention provides a method for analysis of material comprising irradiating the material with fast neutrons, detecting resultant gamma-rays, detecting fast neutrons scattered from the material, effecting a registration of the number of gamma-ray detection events which occur at at least one selected energy, and including in the registration information as to which, if any, of two or more predetermined time intervals after the gamma-ray detection event encompassed detection of a scattered neutron.

The invention further provides apparatus for analysis of material comprising a source of neutrons, the source of neutrons being such as to provide neutrons at an energy in excess of the threshold energy for the inelastic scattering reaction which, amongst those reactions of interest for the analysis, has the highest threshold energy, a gamma-ray detector, a fast neutron detector, registration means for effecting a registration of the number of gamma-ray detection events which occur at at least one selected energy, means for defining two or more predetermined time intervals after each gamma-ray detection event, the said registration means including in the registration information as to which of the said time intervals encompassed detection of a scattered neutron.

Preferably there are three time intervals predetermined to correspond respectively with reactions likely to have occurred within a predetermined first distance from the source, reactions likely to have occurred between said first distance and a predetermined second distance, and reactions likely to have occurred beyond said predetermined distance. In a typical practical situation, the latter time interval will be such as to be dominated by random events in which the detected neutrons are not associated with the detected gamma-ray. The information obtained from the count of events of this category is important in that it gives a measure of the number of random events and can thus be used to correct the counts of events in which a neutron is detected within the first and second time intervals.

Where practicable in the particular conditions of use, it is preferred that the source is a radioisotope neutron source, and preferably the source and the detectors are assembled, together with shielding for preventing direct passage of neutrons or gamma-rays from the source to the detectors, in a tubular housing suitable for feeding into a production borehole.

Figure 2:
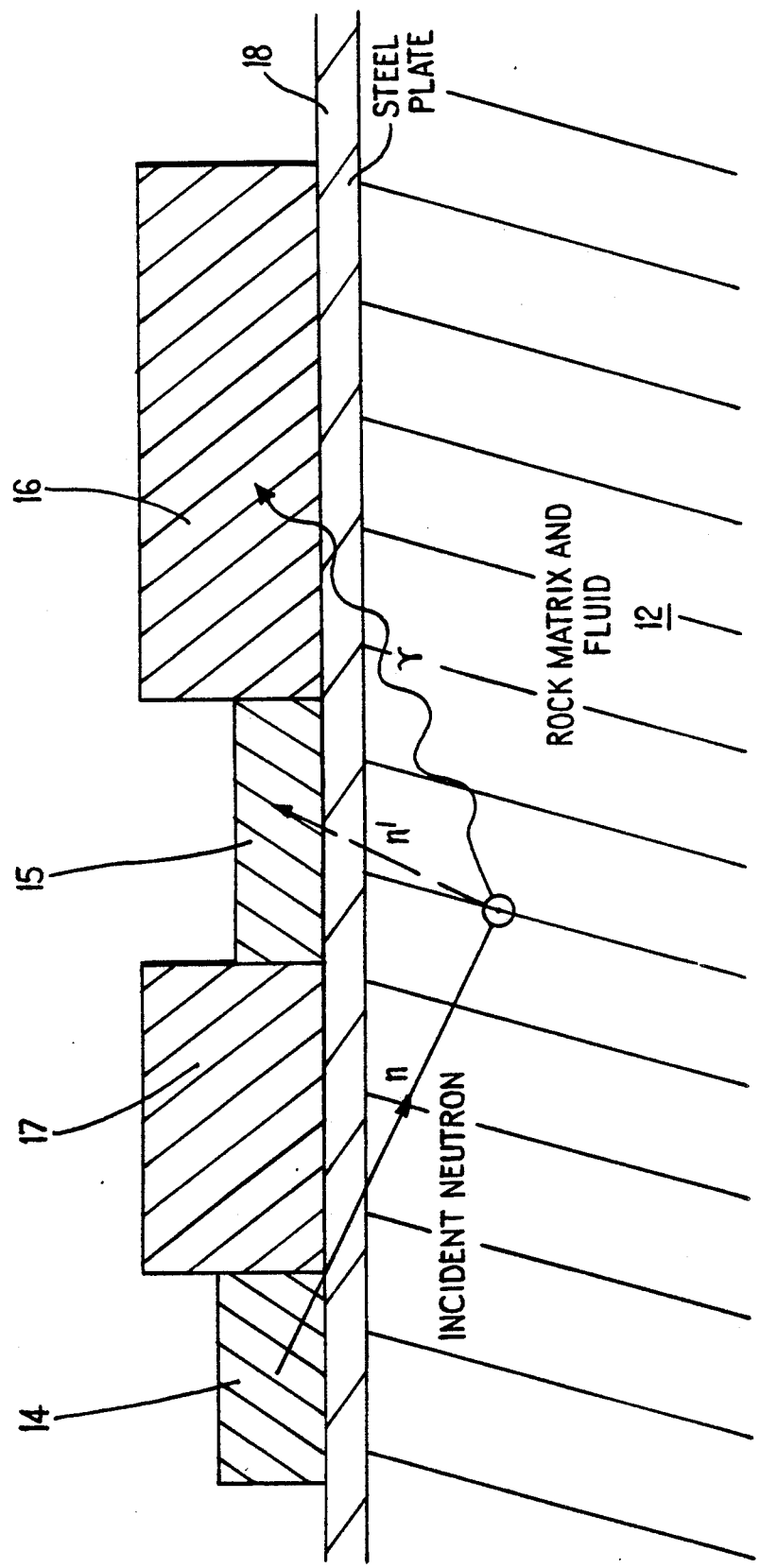
Figure 3:
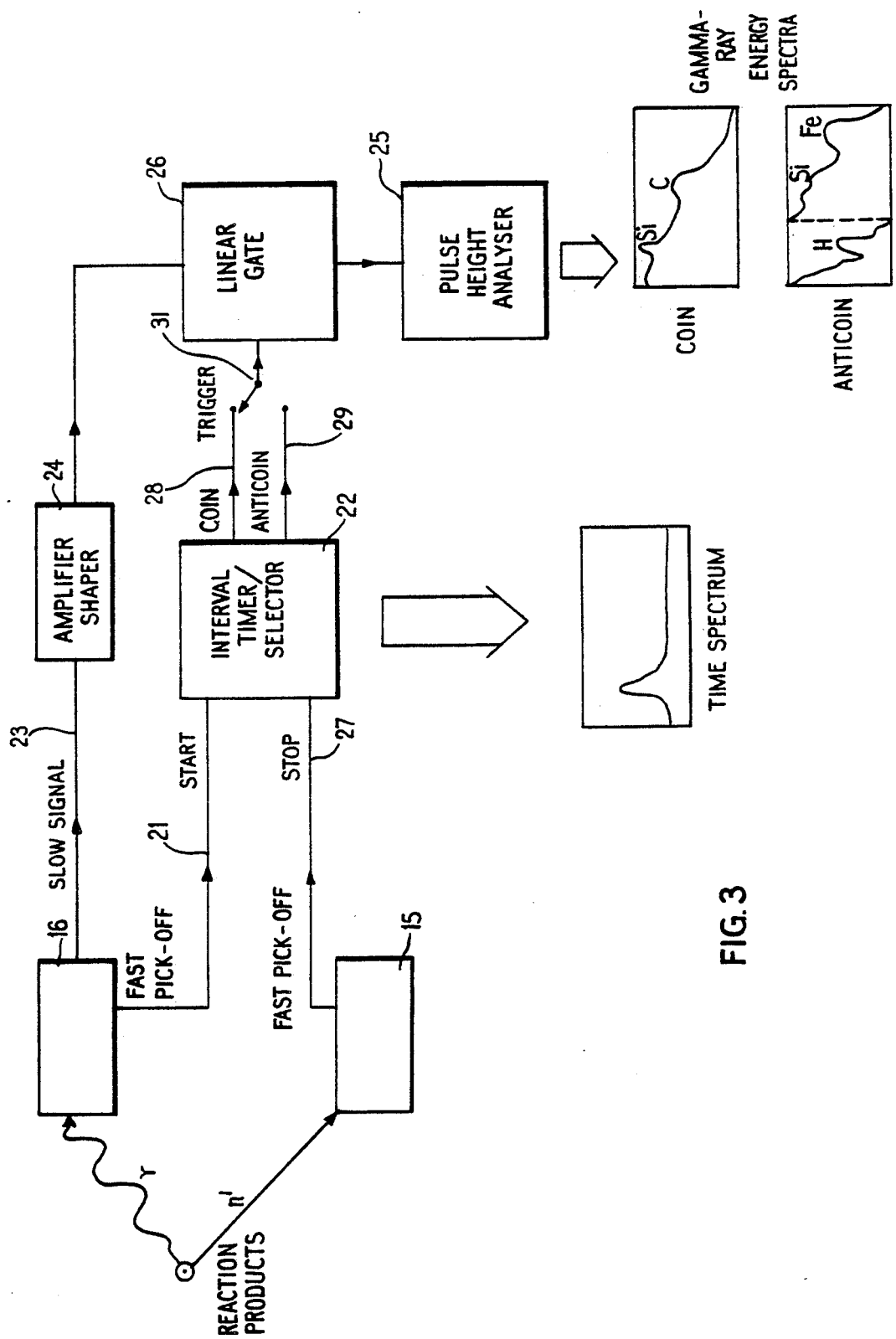
Figure 4:
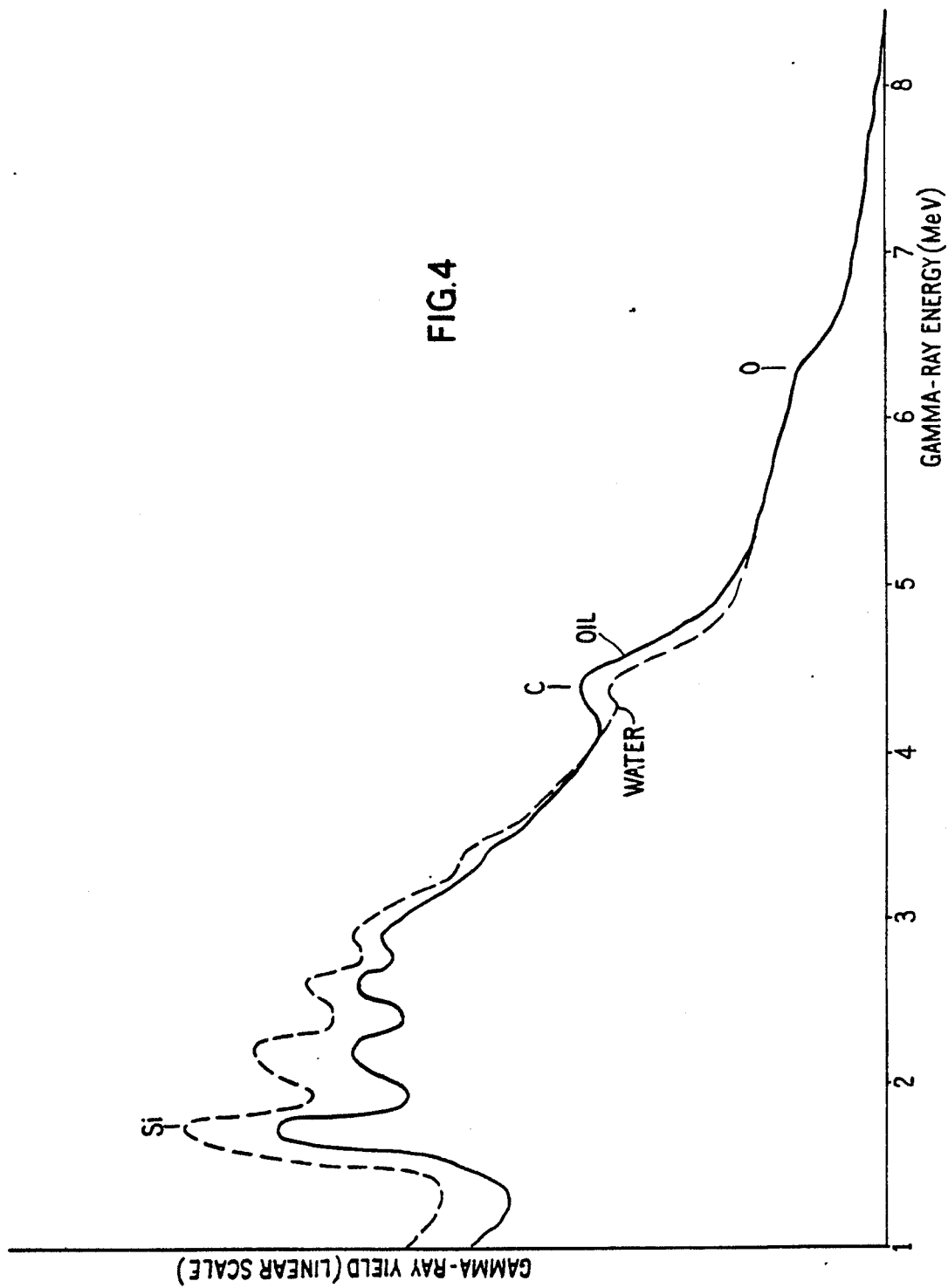
Figure 5:
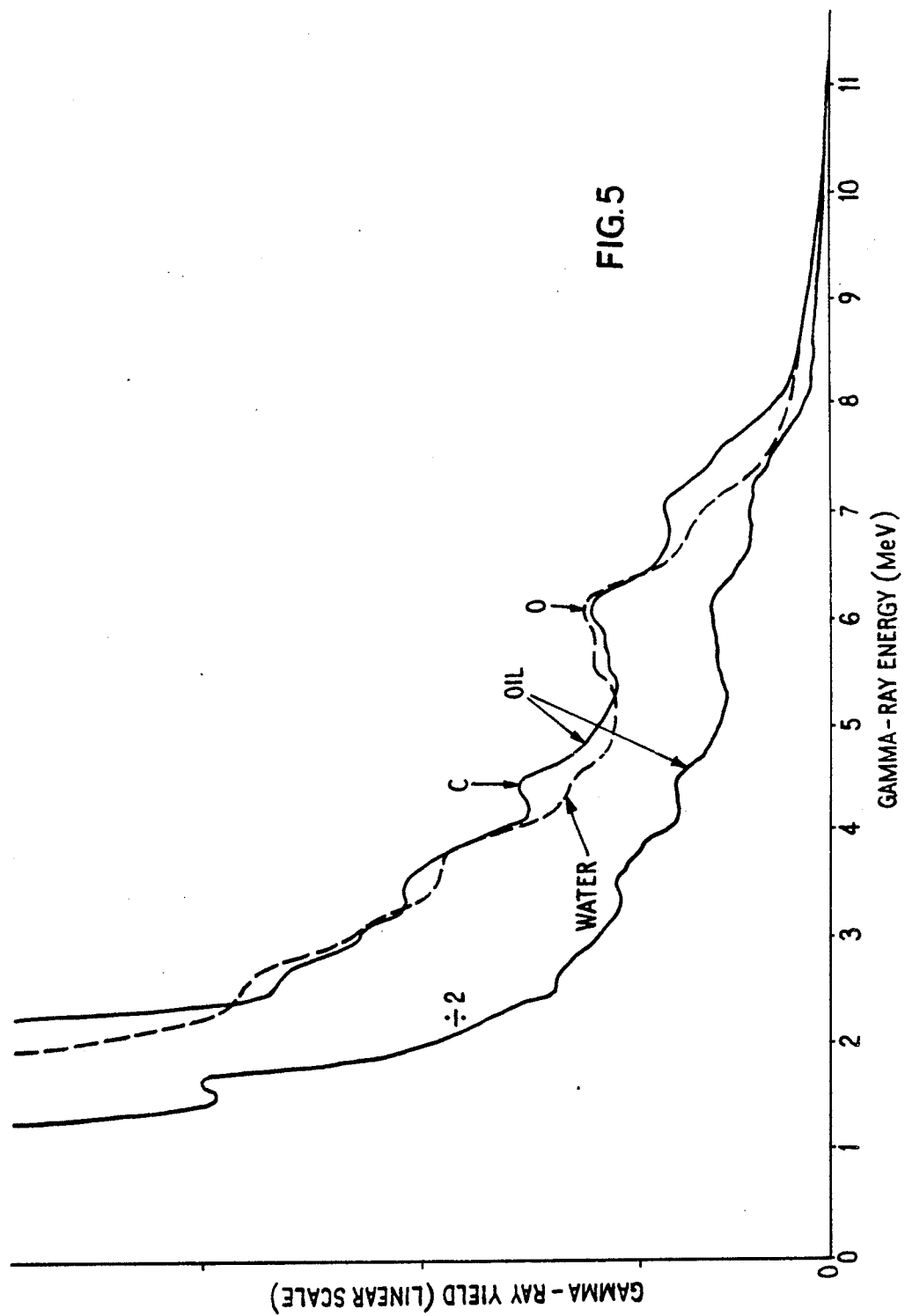
Figure 6:
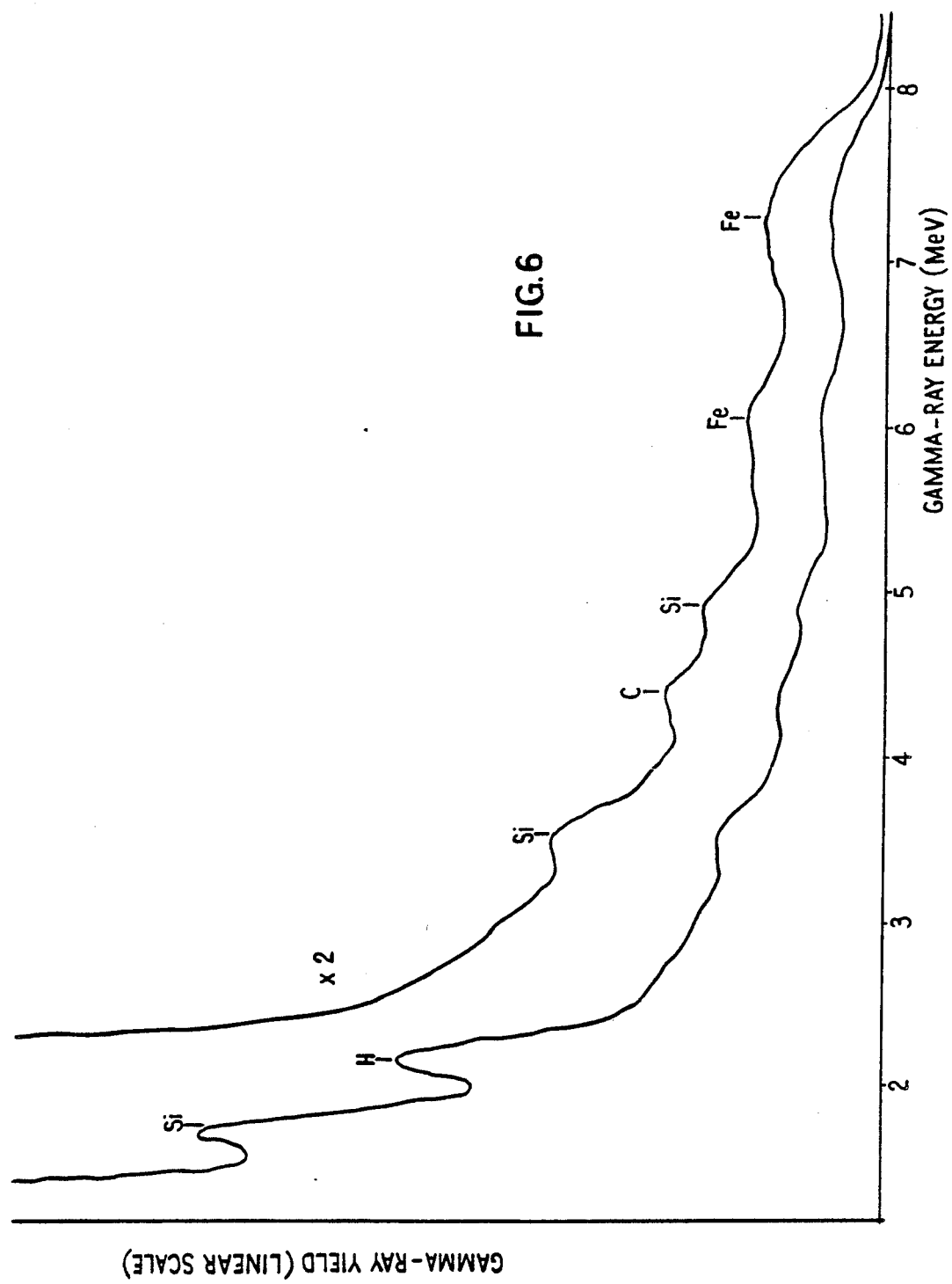
Figure 7:
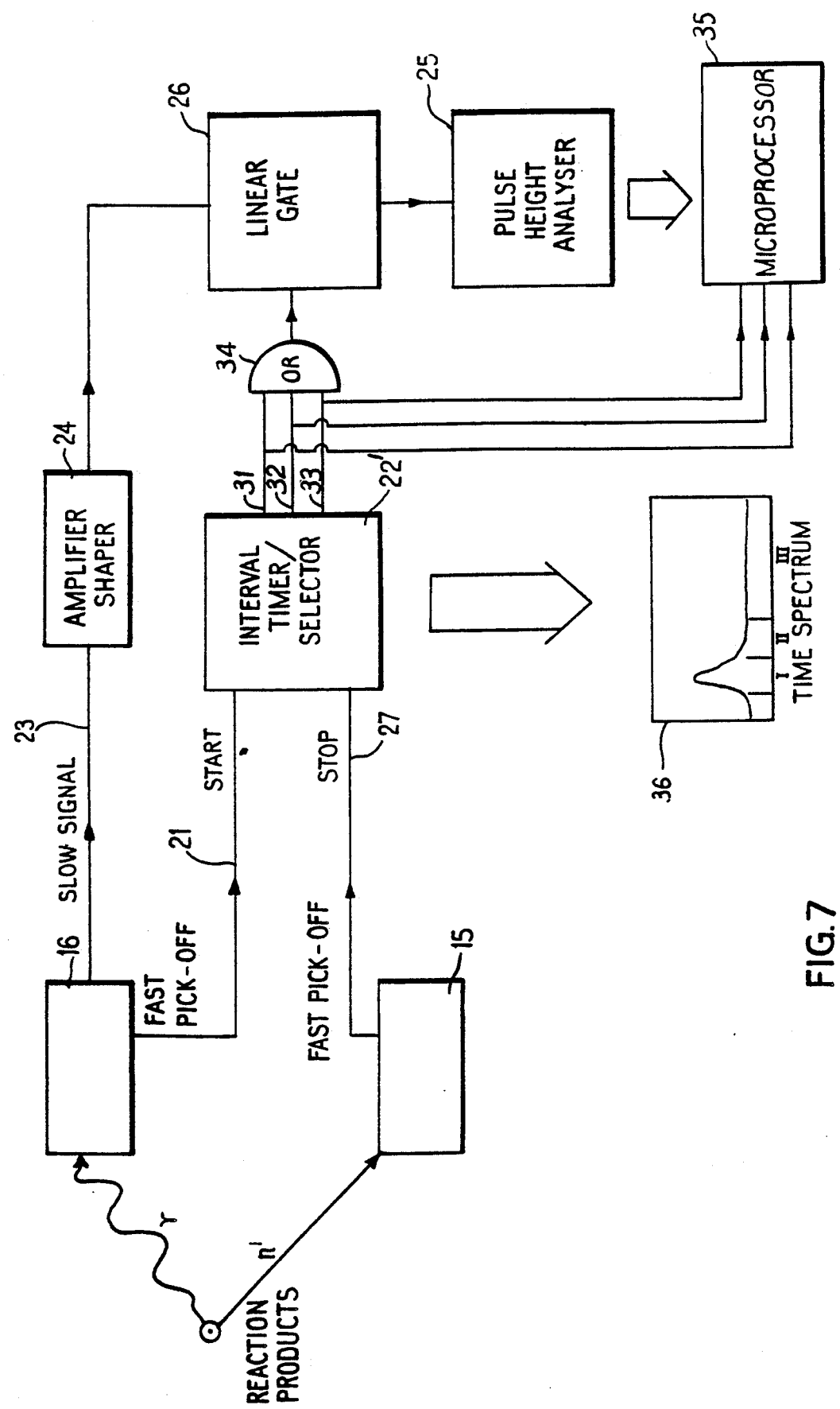

A specific construction of apparatus and a method embodying the invention will now be described with reference to the drawings filed herewith, wherein:

FIG. 1 is a diagrammatic representation of an oilwell borehole logging tool,

FIG. 2 is a diagrammatic representation of an experimental apparatus for investigating the performance of apparatus such as illustrated in FIG. 1, FIG. 3 is a block diagram of the signal processing circuit used with the apparatus of FIG. 2, FIGS. 4 and 6 show gamma-ray spectra using respectively coincidence and anticoincidence counting with the apparatus of FIGS. 2 and 3, FIG. 5 is a graph of gamma-ray spectra for oil and pure water in sandstone using a 14 MeV pulsed neutron generator in accordance with the prior art, and FIG. 7 is a block diagram of a development of the circuit shown in FIG. 3.

FIG. 1 shows a logging tool 10 in a borehole 11 within formation rock 12. Mounted within a casing 13 of the logging tool 10 are a neutron source 14, neutron detector 15, and a gamma-ray detector 16. The detectors 15 and 16 are protected from direct exposure to the neutrons from the source 14 by shielding 17. In this example, the neutron source is a radioisotope source $^{241}$Am/Be. The neutron detector 15 is of the liquid scintillator type and the gamma-ray detector 16 is a bismuth germanate scintillation detector.

In FIG. 2, the equivalent components in the experimental arrangement are referenced with the same reference numerals, a 12 mm thick steel plate 18 corresponding with the lining of a production borehole.

As illustrated diagrammatically in FIGS. 1 and 2, a proportion of the reactions in which incident neutrons from the source are inelastically scattered by nuclei in the formation rock 12 will result in detection of the scattered neutron by neutron detector 15 and detection of the associated gamma-ray by gamma-ray detector 16.

Other reactions of neutrons with nuclei in the formation rock 12 will generate gamma-rays. Of particular interest are neutron capture reactions which principally involve those neutrons which have an energy reduced to a level in thermal equilibrium with the formation material.

Using a coincidence technique it is possible to select for registration only those gamma-rays detected in detector 16 which are in coincidence with detection of a scattered neutron by the neutron detector 15. It is, of course, necessary for the spectrum analysis to measure the energy of the detected gamma-rays and this is done in a conventional manner by integration of the total light output in the light pulse produced by the gamma-ray in the detector 16.

It is also important for the logging tool 10 to produce information from neutron capture reactions. These can be derived from gamma-ray events detected in detector 16 in anticoincidence with neutrons detected in detector 15.

Referring to FIG. 3 two signals are derived from the gamma detector 16. One is a fast pulse signal generated at the start of a gamma detection event. This is supplied on line 21 to an interval timer selector 22, a device, the construction of which will be evident from the description that follows of its function. For an experimental set up, this function has been achieved by combining a standard time to amplitude converter with a standard single channel analyser. The other signal derived from the gamma detector 16 is a full signal pulse which is fed on line 23 to an amplifier/shaper circuit 24 of conventional form. Output from the amplifier/shaper 24 drives a pulse height analyser 25 under control of a linear gate 26.

The fast pulse indicating detection of a neutron in the neutron detector 15 is fed on line 27 to the interval timer selector 22. If the signal on line 21 and that on line 27 are within the short time interval set in the selector 22, then a trigger pulse is generated on a coincidence line 28 at the output of the selector 22. If, on the other hand, the pulse on line 21 and that on line 27 are separated by an interval longer than that set on the selector 22, then a trigger pulse is generated on an anticoincidence line 29 at the output of the selector 22.

Thus, if the control terminal of linear gate 26 is connected via switch 31 to line 28, the pulse height analyser 25 will receive only those signals from the gamma detector 16 which are in coincidence with detection of a neutron by the neutron detector 15. If the control terminal of the linear gate 26 is connected via switch 31 to line 29, then the pulse height analyser 25 will receive only those signals from the gamma detector 16 which are in anticoincidence with detection of a neutron by neutron detector 15.

FIG. 4 shows gamma-ray spectra generated by the pulse height analyser 25 for an experimental sample representing formation rock 12. The spectra were obtained with the apparatus set in the coincidence counting mode. The spectrum shown by the solid line was obtained from sandstone containing oil. The spectrum shown by the dashed line was obtained from sandstone containing water.

Spectra of inelastic scattering reactions from the same samples generated by a conventional technique using a 14 MeV pulsed neutron generator are shown in FIG. 5. In practice, used in a borehole, detailed spectrum analysis by this technique is not practicable and reliance has to be placed upon the strong absorption effect of chlorine in saline water to distinguish water from oil.

The improvement in spectral quality (i.e. improvement in the ratio of the signal to background) for carbon at 4.43 MeV is evident from comparison of FIGS. 4 and 5. With this improvement and the consequent ability to make a more detailed analysis of the spectrum, it is envisaged that oil and water will be readily distinguished in non-saline reservoir rocks.

FIG. 6 shows an anticoincidence spectrum from a sample of sandstone containing oil. Comparison with FIG. 4 demonstrates the excellent separation by the coincidence method of inelastic scattering events from a spectrum (FIG. 6) dominated by thermal neutron capture in which it is impossible to determine for any peak what proportion of the count derived from the main reaction responsible for that peak and what proportion derived from interfering reactions.

A penalty is paid in loss of sensitivity due to the reduction in count rate because of the coincidence requirement. However, within the typical commercial parameters of a neutron flux of $10^8$ per second and a 5 minute counting period, the technique of the invention is capable of sensitivity to a minimum saturation level of oil in sandstone of about 3%.

The timing resolution of the apparatus of the example (FIG. 3) was approximately 10 nanoseconds. A faster gamma ray detector, such as can be secured using a high efficiency barium fluoride scintillator, coupled with improved design and/or improved electronics is capable of a timing resolution of less than 1 nanosecond. With such a capability, it is possible to include in the analysis a measure of the delay within the coincidence time interval between detection of a scattered neutron and detection of the associated gamma-ray. This delay is related to the spatial region in which the inelastic scattering reaction took place. This appreciation can be used to eliminate unwanted signals from fluids within the borehole and from the borehole lining.

FIG. 7 shows a development of the apparatus of FIG. 3 illustrating one arrangement for taking advantage in this way of improved timing resolution.

In FIG. 7 components which perform the same function (albeit with greater timing precision) as the corresponding components in FIG. 3 are referenced with the same numerals.

In the FIG. 7 example, interval timer selector 22' defines three time intervals. The first time interval starts with detection of a gamma-ray event registered by a signal on line 21 and ends after a time corresponding with the likely delay in detecting scattered neutrons from reactions mainly within the borehole and its lining. The second time interval starts with the end of the first time interval and ends after a further delay chosen, in this example, to be long enough to encompass detection of events corresponding to reactions in the formation up to a reasonable distance from the source but not so long that the count is dominated by random events in which the detected neutron is not associated with the gamma-ray event. The third time interval starts with the end of the second time interval and ends after a delay appropriate for returning the circuit within a reasonable time to readiness for detection of the next gamma-ray event. The majority of events in which a neutron is detected in this time interval are random, the detected neutron being unassociated with the gamma-ray event. A stop signal at the interval timer/selector 22' occurs either upon detection of a neutron in detector 15 or at the end of the third time interval.

If a neutron is detected within the first time interval a signal is produced on line 31 which serves two purposes. Via OR gate 34 the signal opens linear gate 26 so that the shaped gamma-ray signal is passed to pulse height analyser 25, the count and its gamma-ray energy level being registered in a memory store in microprocessor 35. The signal on line 31 is also received by the microprocessor 35 and an appropriate time interval coding added to the registration of the count and gamma-ray energy level.

If a neutron is detected in the second time interval a signal is produced on line 32, and if a neutron is detected in the third interval a signal is produced on line 33. In each case operation of the circuit is similar to that described when a signal is produced on line 31 except that, of course, the appropriate time interval code is added to the registration in the memory store of the event in the microprocessor 35.

The time intervals are chosen according to the particular requirements and circumstances of the analysis. However, for production oilwell borehole logging, the first time interval might typically be of the order of 15 nanoseconds, the second time interval of the order of 50 nanoseconds and the third time interval in the range 200 to 500 nanoseconds. This is illustrated diagrammatically at 36 in FIG. 7 by a time spectrum showing a typical form for the number of counts against time. The first second and third time intervals are illustrated by the numerals I, II, III. It will be seen that most of the counts (in time interval I) derive from reactions close to the apparatus—i.e. within the borehole and its lining. There is a contribution to the peak from reactions in the formation but these fall off quite rapidly with time (corresponding to distance from the source/detectors) which during time interval III have settled to the random background level.

It will be appreciated that display or print-out from the microprocessor can be programmed as desired to produce spectra from the data based upon any selection of time interval or combination of time intervals or alternatively a time spectrum at a selected energy level can be generated.

As described, the circuit of FIG. 7 excludes registration of events in which no neutron is detected up to the end of the third time interval. It will be appreciated that such events can be counted (as anticoincidence counts) if desired. It is simply necessary to dispense with the linear gate 26 and add an additional encoding line to the microprocessor 35 on which line a signal is produced when no neutron is detected up to the end of the third time interval.

It will be appreciated that, if desired, more than three time intervals can be set.

The invention is not restricted to the details of the foregoing examples. For instance, a radioisotope neutron source is preferred because it is simpler, smaller and cheaper than a neutron generator. However, a neutron generator can be used as a neutron source in accordance with the invention, and can be used, if desired, in continuous rather than pulsed mode. Whilst commercially available neutron generators produce neutrons at 14 MeV, a lower energy generator would be advantageous for avoiding unwanted high energy reactions, as discussed above. On the other hand, there are circumstances when it is helpful to have the greater penetration and speed of neutrons at 14 MeV.

Production oilwell borehole logging is an application of importance for the apparatus of the foregoing examples, and, in particular, detection of carbon and oxygen. However, the apparatus is readily adapted for detection of other elements and/or for different types of analysis. For example, the apparatus can be used in geological survey boreholes.

Whilst the operation of the apparatus based upon starting the timing interval by detection of the start of a gamma ray event has been described, it is possible to invert the timing sequence. Thus, if the electronic processing equipment is set up to delay the fast pulse signal from the gamma detector 16 by a suitable, constant time period, the signal from the fast neutron detector 15 can be used to start the interval timer selector 22 or 22'. Measurement is then based upon the time interval to the subsequent registration in the timer selector 22 or 22' of the delayed gamma signal. The effect is to reverse the time spectrum (see 36 in FIG. 7).

We claim:

1. A method for analysis of material comprising irradiating the material with neutrons, detecting resultant gamma rays, detecting fast neutrons scattered from the material, and registering the number of gamma detection events at at least one selected energy which occur in coincidence or anticoincidence with detection of a scattered neutron.

2. A method for analysis of material comprising irradiating the material with fast neutrons, detecting resultant gamma-rays, detecting fast neutrons scattered from the material, effecting a registration of the number of gamma-ray detection events which occur at at least one selected energy, and including in the registration information as to which, if any, of two or more predetermined time intervals after the gamma-ray detection event encompassed detection of a scattered neutron.

3. Apparatus for analysis of material comprising a source of neutrons, a gamma-ray detector, a fast neutron detector, and means for registering the number of gamma detection events at at least one selected energy which occur in coincidence or anticoincidence with detection of a scattered neutron, the source of neutrons being such as to provide neutrons at an energy in excess of the threshold energy for the inelastic scattering reaction which, amongst those reactions of interest for the analysis, has the highest threshold energy.

4. Apparatus for analysis of material comprising a source of neutrons, the source of neutrons being such as to provide neutrons at an energy in excess of the threshold energy for the inelastic scattering reaction which, amongst those reactions of interest for the analysis, has the highest threshold energy, a gamma-ray detector, a fast neutron detector, registration means for effecting a registration of the number of gamma-ray detection events which occur at at least one selected energy, means for defining two or more predetermined time intervals after each gamma-ray detection event, the said registration means including in the registration information as to which of the said time intervals encompassed detection of a scattered neutron.

5. Apparatus as claimed in claim 4, wherein said defining means defines three time intervals predetermined to correspond respectively with reactions likely to have occurred within a predetermined first distance from the source, reactions likely to have occurred between said first distance and a predetermined second distance, and reactions likely to have occurred beyond said predetermined second distance.

6. Apparatus as claimed in claim 3, wherein the source is a radioisotope neutron source.

7. Apparatus as claimed in claim 3, wherein the source and the detectors are assembled, together with shielding for preventing direct passage of neutrons or gamma-rays from the source to the detectors, in a tubular housing suitable for feeding into an oil production borehole.

8. Apparatus as claimed in claim 4, wherein the source is a radioisotope neutron source.

9. Apparatus as claimed in claim 5, wherein the source is a radioisotope neutron source.

10. Apparatus as claimed in claim 4, wherein the source and the detectors are assembled, together with shielding for preventing direct passage of neutrons or gamma-rays from the source to the detectors, in a tubular housing suitable for feeding into an oil production borehole.

11. Apparatus as claimed in claim 5, wherein the source and the detectors are assembled, together with shielding for preventing direct passage of neutrons or gamma-rays from the source to the detectors, in a tubular housing suitable for feeding into an oil production borehole.

12. Apparatus as claimed in claim 6, wherein the source and the detectors are assembled, together with shielding for preventing direct passage of neutrons or gamma-rays from the source to the detectors, in a tubular housing suitable for feeding into an oil production borehole.

13. Apparatus as claimed in claim 8, wherein the source and the detectors are assembled, together with shielding for preventing direct passage of neutrons or gamma-rays from the source to the detectors, in a tubular housing suitable for feeding into an oil production borehole.

14. Apparatus as claimed in claim 9, wherein the source and the detectors are assembled, together with shielding for preventing direct passage of neutrons or gamma-rays from the source to the detectors, in a tubular housing suitable for feeding into an oil production borehole.

* * * * *